United States Patent
Larzul (10) Patent No.: US 9,898,565 B2
(45) Date of Patent: Feb. 20, 2018

(54) CLOCK JITTER EMULATION

(71) Applicant: Synopsys, Inc., Mountain View, CA (US)

(72) Inventor: Ludovic Marc Larzul, Folsom, CA (US)

(73) Assignee: Synopsys, Inc., Mountain View, CA (US)

( * ) Notice: Subject to any disclaimer, the term of this patent is extended or adjusted under 35 U.S.C. 154(b) by 130 days.

(21) Appl. No.: 14/952,656

(22) Filed: Nov. 25, 2015

(65) Prior Publication Data
US 2017/0147725 A1    May 25, 2017

(51) Int. Cl.
*G06F 17/50*    (2006.01)
*G06F 11/16*    (2006.01)

(52) U.S. Cl.
CPC ...... *G06F 17/5031* (2013.01); *G06F 17/5027* (2013.01); *G06F 17/5054* (2013.01); *G06F 11/1604* (2013.01); *G06F 17/5045* (2013.01); *G06F 17/5081* (2013.01); *G06F 2217/62* (2013.01); *G06F 2217/84* (2013.01)

(58) Field of Classification Search
None
See application file for complete search history.

(56) References Cited

U.S. PATENT DOCUMENTS

| | | | | |
|---|---|---|---|---|
| 4,975,634 A * | 12/1990 | Shohet | ................... | G01R 29/26 324/76.77 |
| 7,061,286 B2 * | 6/2006 | Nakamura | ....... | G01R 31/31709 327/145 |
| 7,259,601 B2 * | 8/2007 | Zarate | ................... | H03L 7/0814 327/158 |
| 7,512,858 B2 * | 3/2009 | Rivoir | .............. | G01R 31/31709 714/744 |
| 7,573,957 B2 * | 8/2009 | Sartschev | ........ | G01R 31/31727 375/342 |
| 8,289,032 B2 * | 10/2012 | Lee | ................... | G01R 31/31709 324/613 |
| 9,423,441 B2 * | 8/2016 | Lee | ................... | G01R 31/31709 |
| 2016/0306726 A1 * | 10/2016 | Regev | ................. | G06F 11/2205 |
| 2017/0052221 A1 * | 2/2017 | Lee | ................... | G01R 31/31709 |

* cited by examiner

Primary Examiner — Leigh Garbowski
(74) Attorney, Agent, or Firm — Fenwick & West LLP (57) ABSTRACT

An emulator emulating a DUT emulates a clock generator for generating clock signals of the DUT with jitter. As part of generating clock signals, the emulator generates a jitter clock value for each clock signal. To generate a jitter clock value for a clock signal, the emulator identifies a clock parameter stored for the clock signal and sums the clock parameter with a jitter value randomly selected from the jitter range of the clock signal. When a system fast clock cycle starts, the emulator determines the lowest value from the generated jitter clock values. The emulator outputs an edge on clock signal having the lowest jitter clock value. The emulator generates a new jitter clock value for each clock signal and the process repeats during the next system fast clock cycle.

20 Claims, 5 Drawing Sheets

CLOCK JITTER EMULATION

BACKGROUND

1. Field of Art

The disclosure generally relates to the emulation of designs, and more specifically to emulating clocks with jitter.

2. Description of the Related Art

Emulators have been developed to assist circuit designers in designing and debugging highly complex integrated circuit designs (for example, a system on a chip (SOC)). An emulator includes multiple field programmable gate arrays (FPGAs) or specific programmable emulation components that together can imitate the operations of an integrated circuit. By using an emulator to imitate the operations of an integrated circuit, designers can verify that the integrated circuit complies with various design requirements prior to fabrication.

An integrated circuit typically includes multiple components that operate on different clocks. Hence, the integrated circuit includes multiple clock domains. Signals routinely pass between different clock domains. During clock domain crossings, errors/anomalies may be introduced into the integrated circuit. One source of the errors could be the jitter present in the clock signals. For example, two clocks may be designed to operate at 1 GHz. However, because of jitter the likelihood that both clocks will be aligned (both operating at 1 GHz) is very small. Hence, when signals cross the clock domains, errors may occur because the clocks are not operating exactly as expected.

When an emulator emulates an integrated circuit, the clocks in the emulation environment are perfect clocks in that they start and end as designed (do not include jitter). Since the emulated clocks are not taking jitter into account, certain errors caused by jitter may not be detected when emulating the integrated circuit.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein.

Reference will now be made to several embodiments, examples of which are illustrated in the accompanying figures. The figures use like reference numerals to identify like elements. A letter after a reference numeral, such as "302A," indicates that the text refers specifically to the element having that particular reference numeral. A reference numeral in the text without a following letter, such as "302," refers to any or all of the elements in the figures bearing that reference numeral.

Overview

A disclosed system (method and computer program product) are described for emulating clocks of a design under test (DUT) with jitter. An emulator emulates a clock generator to generate clock signals with jitter for a DUT being emulated. The clock generator includes for each clock signal a random jitter generator, an accumulator and a comparator. The clock generator also includes a minimum operator.

Each random jitter generator reads from a memory a clock parameter associated with the respective clock signal. The clock parameter may be, for example, a width of the positive portion (between the rising edge and falling edge) or negative portion (between the falling edge and the next rising edge) of the clock's period. A parameterized random jitter generator generates a jitter clock value for the clock signal based on the read clock parameter and a jitter value randomly selected from a jitter range (e.g., sum the clock parameter and the randomly selected jitter value). The random jitter generator stores the jitter clock value in the respective accumulator.

During a clock cycle of a system fast clock, the minimum operator obtains the jitter clock values stored by the accumulators. The system fast clock operates at a higher frequency than the clocks signals generated by the clock generator. The minimum operator identifies from the jitter clock values the lowest jitter clock value. The minimum operator outputs the lowest jitter clock value to each of the comparators. Each comparator compares the lowest jitter clock value to the jitter clock value stored by the respective accumulator. If the values are not the same, the comparator does not change the respective clock signal. For example, if the clock signal was at a high state, the clock signal is maintained at the high state. Further, the comparator determines the difference between the jitter clock value stored by the accumulator and the lowest jitter clock value. The comparator stores determined difference in the accumulator as a new jitter clock value replacing the value previously stored by the accumulator.

On the other hand, if the values are the same, the comparator causes an edge to be output on the respective clock signal (comparator causes the clock signal to change states). In one embodiment, if the clock signal was at a low state, the comparator outputs a rising edge. However, if the clock signal was at a high state, the comparator outputs a falling edge. The respective random jitter generator generates a new jitter clock value for the clock signal based on a clock parameter read from the memory and a new randomly selected jitter value. The random jitter generator stores the generated jitter clock value in the corresponding accumulator replacing the value previously stored by the accumulator.

During each subsequent system fast clock cycle, the process is repeated of the minimum operator selecting the lowest jitter clock value from the values stored by the accumulators, the comparators determining whether to output an edge for their respective clock signals, and new values being stored in the accumulators. By incorporating jitter values into the clock parameters used to generate the clock signals, the cycles of the clock signals will vary (not all be the same) which is how clocks operate in a real world environment. Further, by incorporating jitter and having the clock signals vary, it is possible to detect, for example, errors that occur during clock domain crossings in the DUT.

Overview Emulation Environment

Figure 1:
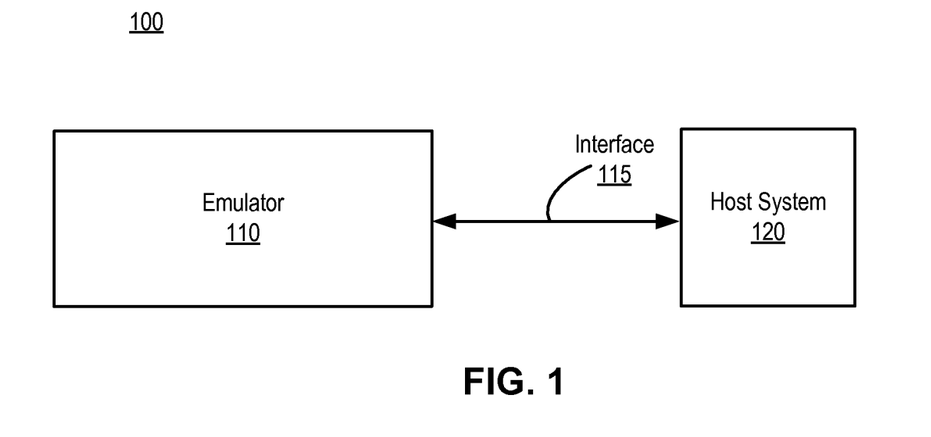
FIG. 1 is a block diagram of an emulation environment, according to one embodiment.

FIG. 1 is a block diagram illustrating an emulation environment 100, according to one embodiment. The emulation environment 100 includes an emulator 110 and a host system 120. The emulator 110 and the host system 120 communicate through an interface 115.

The interface 115 is a communication medium that allows communication between the host system 120 and the emulator 110. In one embodiment, the interface 115 is a cable with electrical connections. For example, the interface 115 may be an USB, ETHERNET, optical, or a custom built cable. In other embodiment, the interface 115 is a wireless communication medium or a network. For another example, the interface 115 may be a wireless communication medium employing a Bluetooth® or IEEE 802.11 protocol.

The emulator 110 is a hardware system that emulates designs under test (DUTs). A DUT is one or more circuit designs emulated by the emulator 110. The emulator 110 includes FPGAs that can be configured to collectively emulate a DUT. In other embodiments, the emulator 110 includes other types of reconfigurable hardware components instead of FPGAs. For a DUT that is to be emulated, the emulator 110 receives from the host system 120 bit streams (e.g., one or more binary files) including a description of a DUT with one or more clock generators that generate clock signals with jitter for the DUT during emulation. Additionally, the bit stream describes partitions of the DUT created by the host system 120, mappings of the partitions to emulator FPGAs, placement of logic (DUT logic and clock generator logic) on FPGAs, and routings between placed logic. Based on the bit streams, the emulator 110 configures the appropriate FPGAs and emulates the DUT.

The host system 120 configures the emulator 110 for emulating a DUT. The host system 120 may be a single computer or a collection of multiple computers. In the embodiment where the host system 120 is comprised of multiple computers, the functions described herein as being performed by the host system 120 may be distributed among the multiple computers.

The host system 120 receives from a user a description of a DUT to be implemented on the emulator 110. In one embodiment, the description of the DUT is in a type of hardware description language (HDL), such as register transfer language (RTL). The host system 120 creates a gate level netlist based on the HDL description of the DUT. In another embodiment, the description of the DUT received from the user is in a gate level netlist. The host system 120 incorporates into the DUT one or more clock generators. Each clock generator generates clock signals of the DUT with jitter.

The host system 120 generates one or more bit streams which include information to configure the emulator FPGAs to emulate the DUT with the clock generators. A bit stream may include, for example, a design description of one or more partitions of the DUT, mapping information (e.g., mappings of partitions to FPGAs), placement and routing information, and design constraints for the DUT.

Through interface 115, the host system 120 transmits to the emulator 110 the created bit streams to configure the FPGAs to emulate the DUT. During and/or after the emulator 110 emulates the DUT, the host system 120 receives emulation results from the emulator 110. Emulation results are information generated by the emulator 110 based on the emulation of the DUT.

Figure 2:
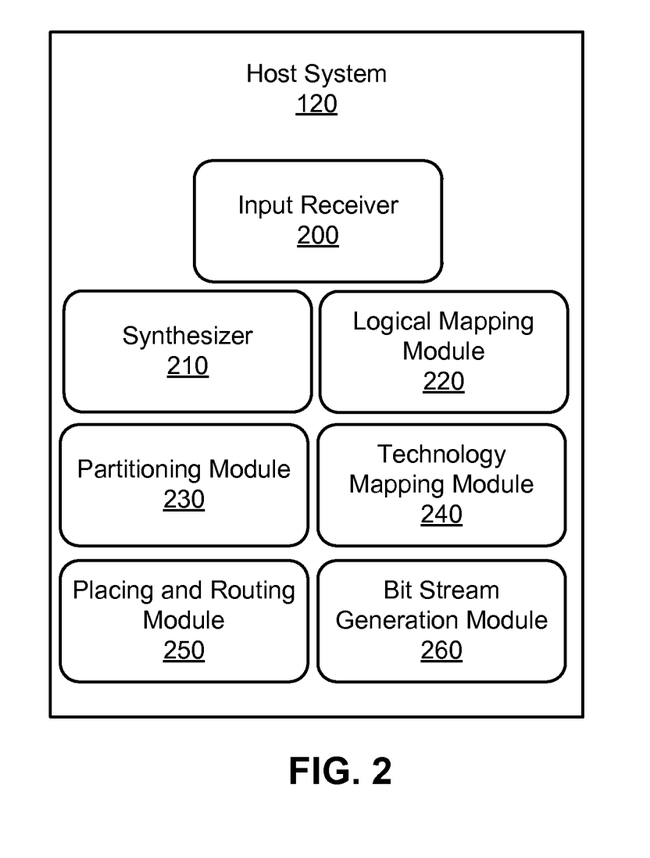
FIG. 2 is a block diagram illustrating a host system, according to one embodiment.

FIG. 2 is a block diagram illustrating the host system 120 in more detail, according to one embodiment. The host system 120 includes an input receiver 200, synthesizer 210, logical mapping module 220, partitioning module 230, technology mapping module 240, placing and routing module 250, and bit stream generation module 260. Each of these components may be embodied as hardware, software, firmware, or a combination thereof. Together these components generate information to configure the emulator 110 to emulate a DUT.

The input receiver 200 receives descriptions of DUTs to be implemented by the emulator 110. In one embodiment, the input receiver 200 receives a description of a DUT in HDL or in a gate level netlist.

The synthesizer 210 converts HDL descriptions into gate level logic. If a description of the DUT is received in HDL, the synthesizer 210 synthesizes the HDL description to create a gate level netlist with a description of the DUT in terms of gate level logic. In one embodiment, the synthesizer 210 also converts a received gate level netlist for the DUT into another gate level netlist.

The logical mapping module 220 maps logic of the DUT to components available in the FPGAs of the emulator 110. The logical mapping module 220 identifies logic included in the gate level netlist of the DUT that is not available in the emulator FPGAs and associates (assigns) a corresponding hardware component that is available in an emulator FPGA. For example, the logical mapping module 220 identifies a Boolean logic gate in the gate level netlist and associates the Boolean logic gate with a corresponding logic gate or a look up table (LUT) unit available in an FPGA. In one embodiment, the logical mapping module 220 modifies the gate level netlist based on the mapping.

In one embodiment, the logical mapping module 220 also incorporates into the DUT one or more clock generators that generate the clock signals of the DUT. The clock signals generated by a clock generator include jitter. Details of the components and design of a clock generator are described below with reference to FIG. 3.

In one embodiment, the logical mapping module 220 analyzes the DUT and identifies the clock signals of the DUT. For each set of clock signals, the logical mapping module 220 includes a clock generator. In another embodiment, the logical mapping module 220 includes a single clock generator for generating all of the DUT's clock signals. The logical mapping module 220 incorporates the one or more clock generators by modifying the gate level netlist of the DUT. In another embodiment, the one or more clock generators are incorporated into the DUT prior to synthesizing the HDL description of the DUT.

The partitioning module 230 partitions the DUT and maps the partitions to emulator FPGAs. The partitioning module 230 partitions the DUT at the gate level into a number of partitions using the DUT's netlist. The partitioning module 230 maps each partition to one or more FPGAs of the emulator 110. The partitioning module 230 performs the partitioning and mapping using design rules, design constraints (e.g., timing or logic constraints), and information about the emulator 110.

The technology mapping module 240 maps physical components of the DUT based on the logical mapping and partitioning. Specifically, if necessary, the technology mapping module 240 modifies one or more partitions based on the partitions created and the mappings of the partitions to the FPGAs. For example, assume the DUT includes three logic gates where an output of a first logic gate is connected to an input of a second logic gate and an input of a third logic gate. The DUT may be partitioned such that the first logic gate and the second logic gate are to be implemented on the same FPGA, but the third logic gate is to be implemented on a different FPGA. A connection between the first logic gate and the third logic gate in different FPGAs may have an additional delay compared to a connection between two logic gates in the same FPGA, thereby causing incorrect operations. The technology mapping module 240 may add delay elements (or buffers) between the two logic gates on the same FPGA to match the delay between the logic gates on different FPGAs.

The placing and routing module 250 receives the gate level netlist and information about the partitioning and mapping, and determines placement and connections of each DUT logic component (including clock generator components). The placing and routing module 250 places the logic components and the debugging logic in a manner that routings between the logic components and the debugging logic are optimized.

The bit stream generation module 260 generates one or more bit streams describing information about configurations of the FPGAs of the emulator 110. The configurations of the FPGAs include placements of hardware components to be implemented, connections (i.e., routings) between components and other design information. The bit stream generation module 260 transmits the bits streams to the emulator 110 so that the FPGAs of the emulator 110 can be configured for emulating the DUT with the one or more clock generators. The bit streams may be stored and provided to the emulator 110 upon receiving instructions to transmit the bit streams.

Figure 3:
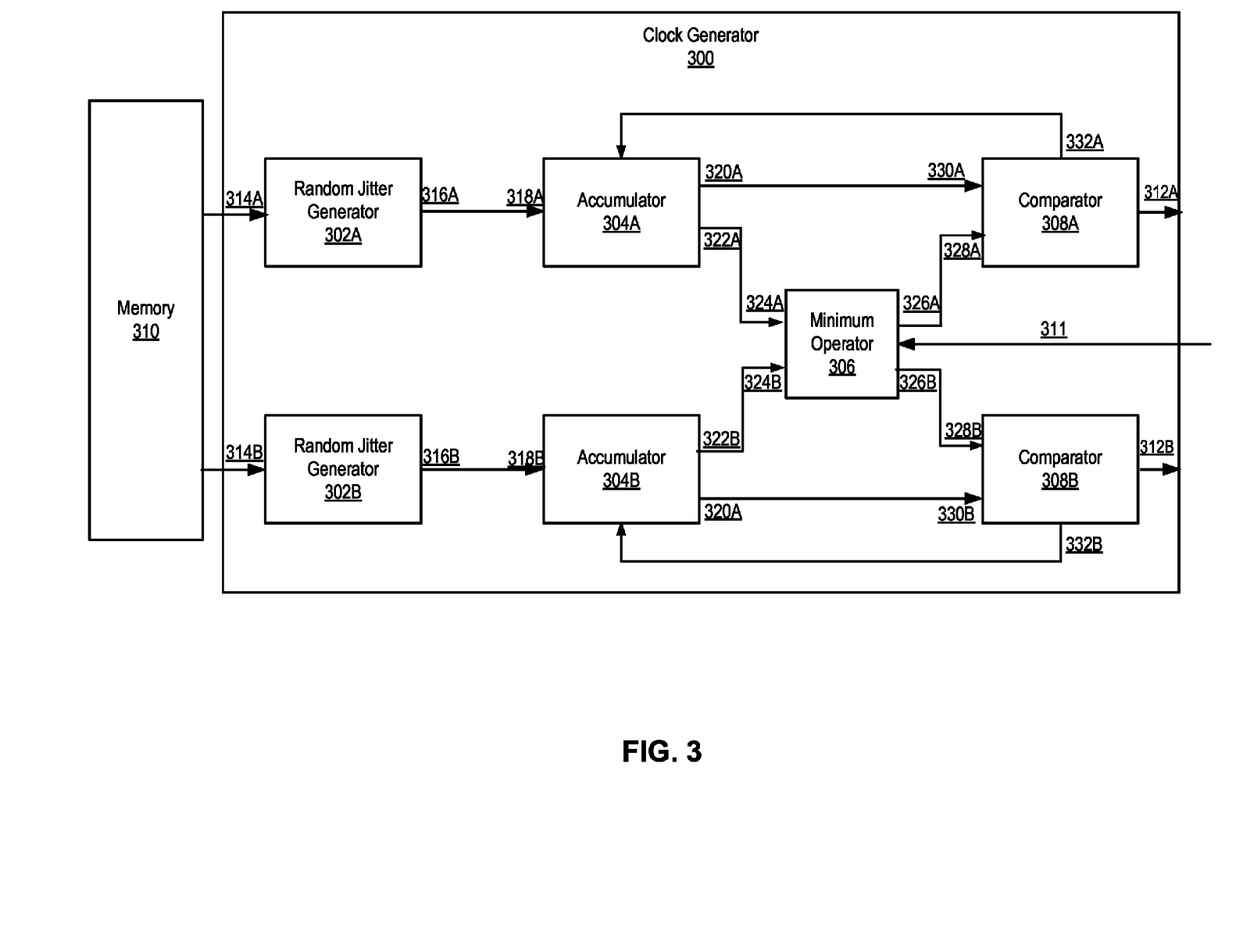
FIG. 3 is a block diagram illustrating a clock generator emulated by an emulator to generate clock signals, according to one embodiment.

FIG. 3 is a block diagram illustrating a clock generator 300 emulated by the emulator 110 to generate clock signals for an emulated DUT. In this example, the illustrated clock generator 300 generates two clock signals 312A and 312B of the DUT. Only two clocks signals 312 are shown in this embodiment for purposes of simplicity. However, in other embodiments, the clock generator 300 will generate more than two clock signals 312. The clock generator 300 operates according to a system fast clock 311 that operates at a higher frequency than the clocks signals 312. In one embodiment, during each cycle of the system fast clock 311 at least one of the clock signals 312 outputs an edge (e.g., rising edge or falling edge).

The clock generator 300 includes random jitter generators 302A and 302B, accumulators 304A and 304B, minimum operator 306, and comparators 308A and 308B. Random jitter generator 302A, accumulator 304A, and comparator 308A are used to generate clock signal 312A. Random jitter generator 302B, accumulator 304B, and comparator 308B are used to generate clock signal 312B. In other embodiments where the clock generator 300 generates additional clock signals 312 (in addition to signals 312A and 312B), the clock generator 300 will include an additional random jitter generator 302, accumulator 304, and comparator 308 for each additional clock signal.

The random jitter generators 302 incorporate jitter into their respective clock signal 312. In one embodiment, each random jitter generator 302 stores a jitter range (e.g., −N to +M) which represents the jitter values that the corresponding clock signal 312 can have. The jitter range is set based on design specification of the corresponding clock signal. For example, the design specification of a clock signal 312 may indicate that the clock signal 312 operates at 1 GHz±10% jitter. Based on the ±10%, the jitter range is set. In another embodiment, the random jitter generator 302 stores more complex jitter values which allow determining the jitter value based on an equation using those parameters.

Through input 314 each random jitter generator 302 reads a clock parameter of the corresponding clock signal 312 from memory 310. In one embodiment, the memory 310 is separate from the clock generator 300 as shown in FIG. 3. In other embodiments, the memory 310 is part of the clock generator 300. In another embodiment, multiple memories are used to store the clock parameters. In another embodiment, there is no memory and the clock parameters are obtained through other means, like a communication channel.

In one embodiment, each clock parameter stored by the memory 310 is associated with a period of a clock cycle. In one embodiment, for each clock signal 312, the memory 310 stores at least two clock parameters. One clock parameter is the width of the positive portion of the clock's period, which is between the rising edge and the falling edge. The other clock parameter is the width of the negative portion of the clock's period, which is between the falling edge and the next rising edge. The random jitter generator 302 reads at least one of the clock parameters of its respective clock signal 312. In another embodiment, for each clock signal 312, the memory 310 stores a single clock parameter which is half the period of the clock's cycle. In another embodiment, the single clock parameter stored is the period of the clock's cycle. In another embodiment, the parameters stored are the period and the duty cycle of the clock.

A random jitter generator 302 randomly selects a jitter value within the stored jitter range (e.g., select a value between −N and +M). The random jitter generator 302 generates a jitter clock value based on the read clock parameter and the randomly selected jitter value. In one embodiment, the random jitter generator 302 generates the jitter clock value by summing the read clock parameter and the randomly selected jitter value. In other embodiments, the jitter clock value can be generated by combining the clock parameter and the randomly selected jitter value in a different manner (e.g., multiply, divide, or calculate the difference between the clock parameter and the jitter value). The random jitter generator 302 outputs the jitter clock value via output 316 for storing the jitter clock value in the accumulator 304.

Each accumulator 304 is a storage component that stores a jitter clock value. An accumulator 304 receives the jitter clock value from the corresponding random jitter generator 302 through input 318A and stores the value. The accumulator 304 outputs the jitter clock value to its respective comparator 308 via output 320 and also outputs the jitter clock value to the minimum operator 306 via output 322.

The minimum operator 306 receives the system fast clock 311 and during a cycle of the system fast clock, the minimum operator 306 selects the lowest jitter clock value from the values stored by the accumulators 304. The minimum operator 306 receives the jitter clock values stored by the accumulators 304 via inputs 324. From the received jitter clock values, the minimum operator 306 selects the jitter clock value with the lowest value. The minimum operator 306 outputs the lowest jitter clock value to the comparators 308 via outputs 326.

A comparator 308 determines whether to output an edge on its respective clock signal 312. Each comparator 308 receives via input 328 the lowest jitter clock value output by the minimum operator 306. Each comparator 308 also receives via input 330 the jitter clock value stored by its respective accumulator 304. A comparator 308 compares the jitter clock value stored by the accumulator 304 to the lowest jitter clock value. If the values are not the same, the comparator 308 does not change the state of its respective clock signal 312 (does not output an edge). On the other hand, if the values are the same, the comparator 308 changes the state of the clock signal 312. If the clock signal 312 was at a low state, the comparator 308 outputs a high state (a rising edge) for the clock signal 312. However, if the clock signal was at a high state, the comparator outputs a low state (a falling edge).

In one embodiment, when the values are the same, instead of changing the state of the clock signal 312 during the current system fast clock cycle, the comparator 308 may wait for one or more additional system fast clock cycles to pass before changing the state of the clock signal 312. The comparator 308 may wait to change the state because it is not the right time or because certain conditions have not been met. For example, if a test bench running the emulator 110 is not ready to output the state change, the comparator 308 will wait until the test bench is ready.

Further, each comparator 308 calculates the difference between the value stored by the respective accumulator 304 and the lowest jitter clock value. A comparator 308 outputs the calculated difference via output 332 and stores the difference in the respective accumulator 304 as the new jitter clock value. The new jitter clock value replaces the value previously stored by the accumulator 304. In another embodiment, instead of comparing the jitter clock value stored by the accumulator 304 to the lowest jitter clock value for determining whether to generate an edge, the comparator 308 calculates the difference between the accumulator value and the lowest jitter clock value and determines to generate an edge if the calculated difference is equal to zero.

If the value stored by the comparator 308 in the accumulator 304 is zero, the respective random jitter generator 302 generates a new jitter clock value for the accumulator 304. The random jitter generator 302 reads a clock parameter of the respective clock signal 312 from the memory 310. In the embodiment where the memory 310 stores at least two clock parameters for each clock signal 312, the random jitter generator 302 reads a clock parameter different from the clock parameter previously read. For example, if the random jitter generator 302 previously read the width of the positive portion of the clock cycle, the random jitter generator 302 reads the width of the negative portion. The random jitter generator 302 generates a new jitter clock value by summing the read clock parameter and a jitter value randomly selected from the jitter range. The random jitter generator 302 stores the new jitter clock value in the accumulator 304 replacing the previously stored value.

During the next cycle of the system fast clock, the accumulators 304 output their stored jitter clock value, the minimum operator 306 selects the lowest jitter clock value, the comparators 308 determine whether to output an edge, and new jitter clock values are stored in the accumulators 304. Hence, the process repeats during each cycle of the system fast clock. Further, each time a clock parameter is read from the memory 310, jitter is incorporated into the parameter by a random jitter generator 302. In one embodiment, the process is repeated only when a new edge is required on any of the clocks.

In one embodiment, one or more memories are used to store the accumulators 304. A memory storing the accumulators 304 can be memory 310.

In one embodiment, the operations described in FIG. 3 are performed by a processor or a micro-controller. In this embodiment, the components 302, 304, 306, and 308 are instructions that cause the processor to read the clock parameters from a memory 310, select a clock jitter value, store the accumulation, calculate a minimum, perform the comparison, issue clock edges and update the accumulators. The order of instructions can be different.

Figure 4:
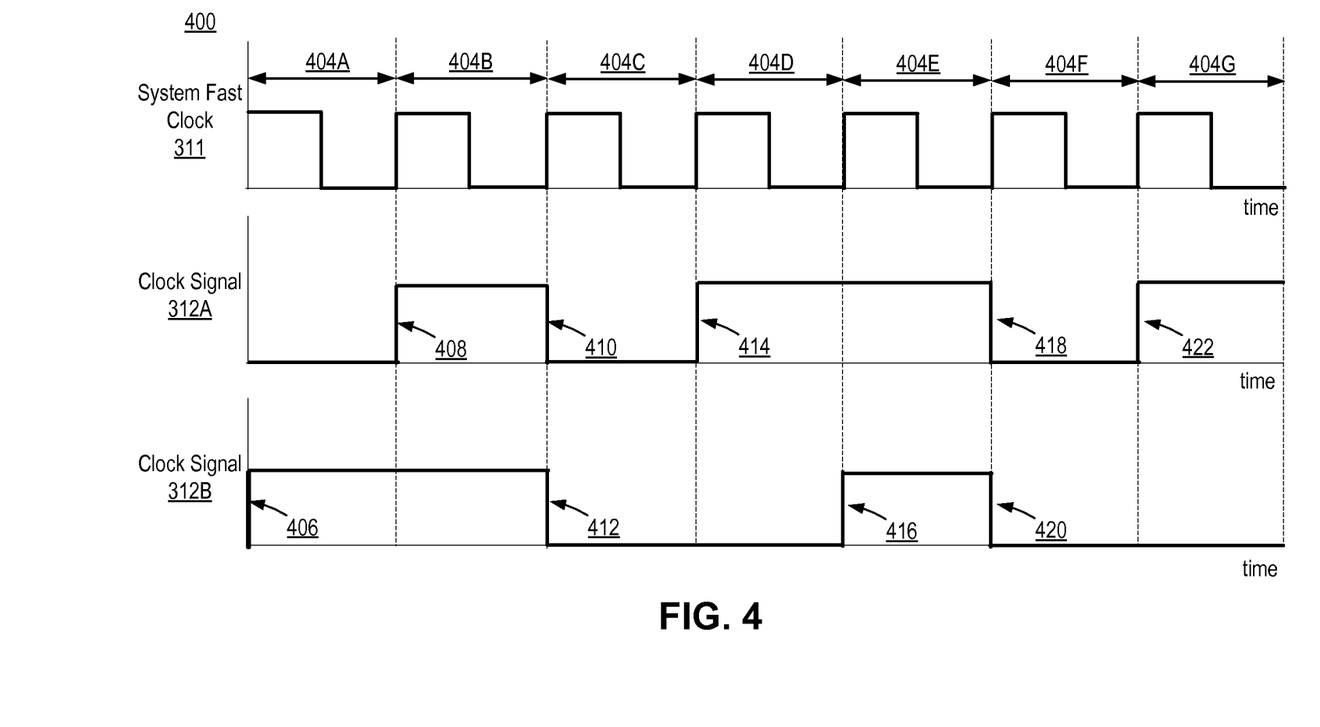
FIG. 4 is a timing diagram illustrating clock signals and a system fast clock, according to one embodiment.

FIG. 4 is a timing diagram 400 illustrating clock signal 312A, clock signal 312B, and system fast clock 311 during operation of the clock generator 300 according to one embodiment. The timing diagram 400 illustrates seven cycles of the system fast clock 404A, 404B, 404C, 404D, 404E, 404F, 404G. For this example, assume that clock signals 312 start at a low state and the memory 310 stores a single clock parameter for each clock signal 312. For signal 312A the memory 310 stores a clock parameter of '55' and for signal 312B the memory 310 stores a clock parameter of '60.' Further, assume that the jitter range for signal 312A is '±5' and that the jitter range for signal 312B is '±3.'

When the clock generator 300 is initialized the clock generator 300 reads the clock parameter of '55' for clock signal 312A from the memory 310 and randomly selects a jitter value of '+4' from the jitter range '±5.' The clock generator 300 sums the clock parameter and the jitter value and stores the result '59' in accumulator 304A. Additionally, the clock generator 300 reads the clock parameter of '60' for clock signal 312B from the memory 310 and selects a jitter value of '−3' from the jitter range '±3.' The clock generator 300 sums them and stores the result '57' in accumulator 304B.

During clock cycle 404A, the clock generator 300 determines that accumulator 304B includes the lowest value of '57' and as a result outputs rising edge 406 for clock signal 312B. The clock generator 300 reads the clock parameter of '60' for clock signal 312B from the memory 310 and randomly selects a jitter value of '−2' from the corresponding jitter range. The clock generator 300 sums the clock parameter and jitter value and stores the result '58' in accumulator 304B replacing the previously stored value. Additionally, clock generator 300 determines the difference between the value stored by accumulator 304A '59' and the lowest value '57.' The clock generator 300 stores the result '2' in accumulator 304A.

During cycle 404B, the clock generator 300 determines that accumulator 304A includes the lowest value of '2' and as a result outputs rising edge 408 for clock signal 312A. The clock generator 300 reads the clock parameter of '55' for clock signal 312A from the memory 310 and randomly selects a jitter value of '+1.' The clock generator 300 sums the clock parameter and the jitter value and stores the result '56' in accumulator 304A. Additionally, clock generator 300 determines the difference between the value stored by accumulator 304B '58' and the lowest value '2.' The clock generator 300 stores the result '56' in accumulator 304B.

During cycle 404C, the clock generator 300 determines that accumulators 304A and 304B both include the lowest/same value of '56.' As a result, the clock generator 300 outputs falling edge 410 for clock signal 312A and falling edge 412 for clock signal 312B. The clock generator 300 reads the clock parameter of '55' for clock signal 312A from the memory 310 and randomly selects a jitter value of '+2' from the corresponding jitter range. The clock generator 300 sums the clock parameter and the jitter value and stores the result '57' in accumulator 304A. Additionally, the clock generator 300 reads the clock parameter of '60' for clock signal 312B from the memory 310 and randomly selects a jitter value of '−2' from the corresponding jitter range. The clock generator 300 sums the clock parameter and the jitter value and stores the result '58' in accumulator 304A.

During clock cycle 404D, the clock generator 300 outputs rising edge 414 for clock signal 312A because accumulator 304A includes the lowest value of '57.' The clock generator 300 stores a jitter clock value of '60' in the accumulator 304A based on the sum of the clock parameter '55' read from the memory 310 and a randomly selected jitter value of '+5.' Additionally, the clock generator 300 stores a jitter clock value of '1' in accumulator 304B because it is the difference between the value previously stored by accumulator 304B '58' and the lowest value '57.'

During clock cycle 404E, the clock generator 300 outputs rising edge 416 for clock signal 312B because accumulator 304B includes the lowest value of '1.' The clock generator 300 stores a jitter clock value of '59' in the accumulator 30BA based on the sum of the clock parameter '60' and a randomly selected jitter value of '−1.' Additionally, the clock generator 300 stores a jitter clock value of '59' in accumulator 304A because it is the difference between the value previously stored by accumulator 304A '60' and the lowest value '1.'

During clock cycle 404F, the clock generator 300 outputs falling edge 418 for clock signal 312A and falling edge 420 for clock signal 312B because accumulator 304A and 304B both include the lowest value of '59.' The clock generator 300 stores a jitter clock value of '50' in accumulator 304A (sum of the clock parameter '55' and randomly selected jitter value of '−5'). The clock generator 300 also stores a jitter clock value of '63' in accumulator 304B (sum of the clock parameter '60' and randomly selected jitter value of '+3'). During clock cycle 404G, the clock generator 300 outputs rising edge 422 for clock signal 312A because accumulator 304A includes the lowest value of '50.'

The table below illustrates the values stored by each accumulator 304 at the start of each system fast clock cycle 404 according to the example of FIG. 4. A star indicates that a new value was obtained from the random jitter generator 302.

|  | Cycle 404A | Cycle 404B | Cycle 404C | Cycle 404D | Cycle 404E | Cycle 404F | Cycle 404G |
| --- | --- | --- | --- | --- | --- | --- | --- |
| Accumulator 304A | 59* | 2 | 56* | 57* | 60* | 59 | 50* |
| Accumulator 304B | 57* | 58* | 56 | 58* | 1 | 59* | 63* |

Figure 5:
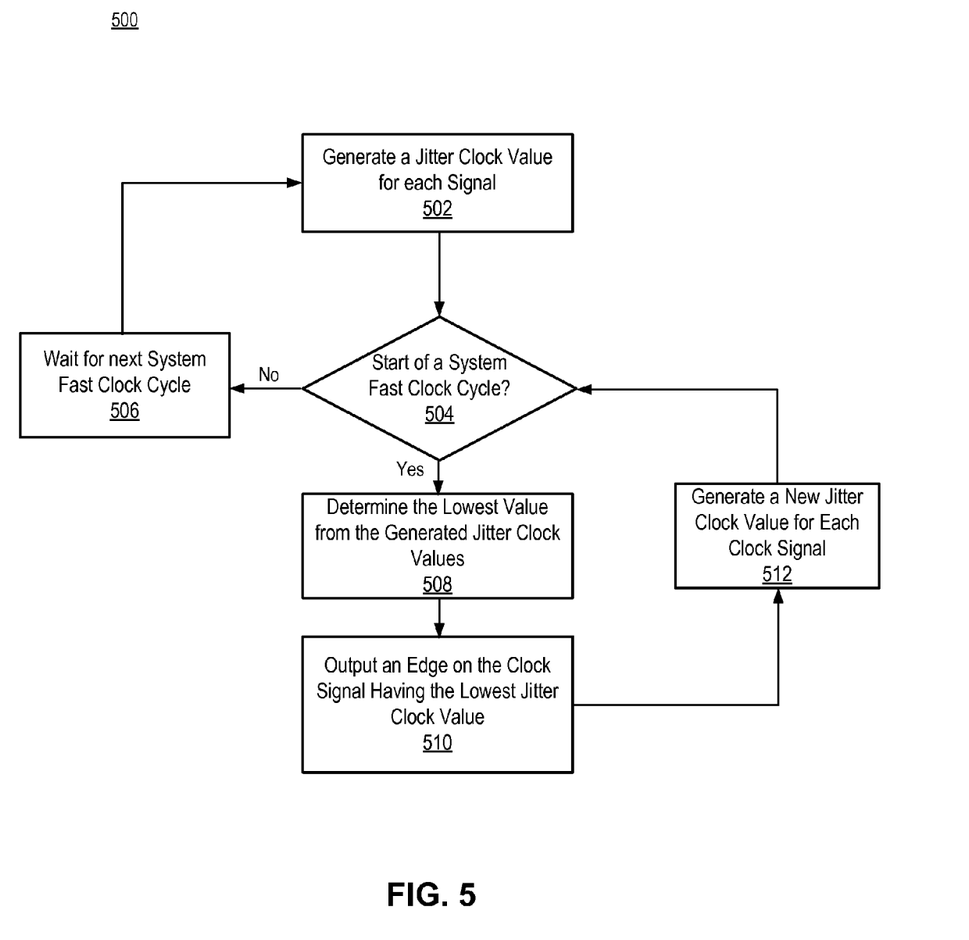
FIG. 5 is a flow chart illustrating a process of emulating multiple clock signals, according to one embodiment.

As can be seen in the timing diagram 400, by including jitter, the cycles of the clock signals 312 will vary. For example, for clock signal 312A, there are two system fast clock cycles (cycles 404B and 404C) between rising edges 408 and 414. However, between rising edges 414 and 422, there are three system fast clock cycles (cycles 404D-404F). If jitter was not included, all of the cycles of each clock signal 312 would be the same. The jitter and variation in the clock signals 312 allows the emulator 110 to properly emulate, for example, clock domain crossings in the DUT. One may also notice that without jitter the first clock edge would have been on clock signal 312A as it has a lower value '55' than the clock signal 312B with a value '60'. As the edge on clock signal 312B comes first, it may expose design bugs that would not have been exposed without this invention FIG. 5 is a flow chart illustrating a process of emulating multiple clock signals of a DUT, according to one embodiment. Other embodiments can perform the steps of FIG. 5 in different orders. Moreover, other embodiments can include different and/or additional steps than the ones described here.

Assume for purposes of this example the emulator 110 stores clock parameters for the clock signals of the DUT. Additionally, assume that the emulator 110 stores a jitter range for each clock signal that represents the jitter values the clock signal can have.

The emulator 110 generates 502 a jitter clock value for each clock signal. To generate a jitter clock value for a clock signal, the emulator 110 identifies a clock parameter stored for the clock signal and sums the clock parameter with a jitter value randomly selected from the jitter range of the clock signal. The emulator 110 determines 504 whether a cycle of a system fast clock has started. If a system fast clock cycle has not started, the emulator 110 waits 506 for the start of the next the system fast clock cycle.

When a system fast clock cycle starts, the emulator 110 determines 508 the lowest value from the generated jitter clock values. The emulator 110 outputs 510 an edge on clock signal having the lowest jitter clock value.

The emulator 110 generates 512 a new jitter clock value for each clock signal. If a clock signal did not have the lowest jitter clock value, the emulator 110 determines for the clock signal the new jitter clock value to be the difference between the jitter clock value previously generated for the clock signal and the lowest value. If a clock signal had the lowest jitter clock value, the emulator 110 determines for the clock signal the new jitter clock value to be the sum of a clock parameter stored for the clock and a jitter value randomly selected from the jitter range of the clock signal. Steps 504-512 are then repeated for the new generated jitter clock value.

Computing Machine Architecture

Figure 6:
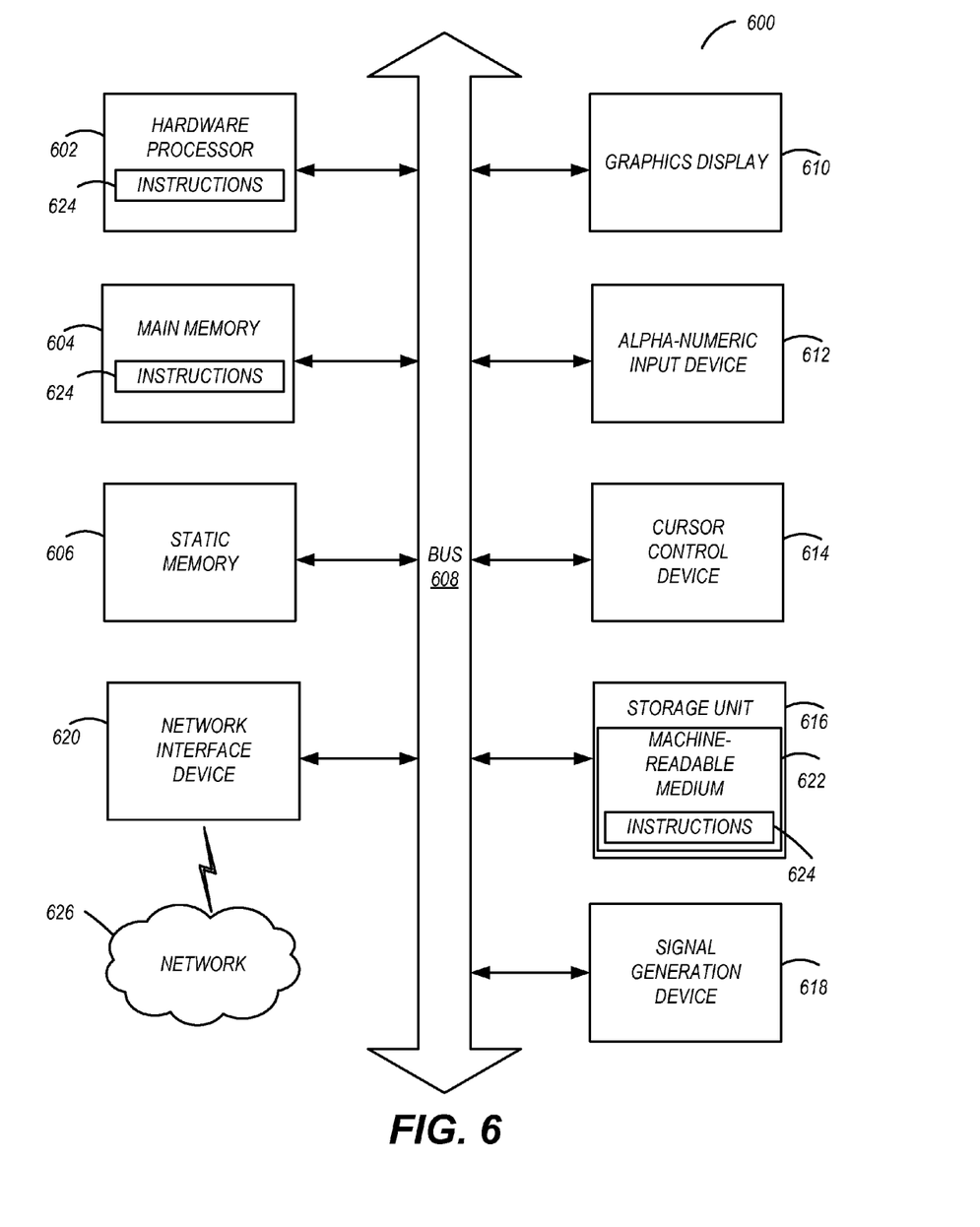
FIG. 6 is a block diagram illustrating components of an example machine able to read instructions from a machine-readable medium and execute them in a processor, according to one embodiment.

Turning now to FIG. 6, it is a block diagram illustrating components of an example machine able to read instructions from a machine-readable medium and execute them in a processor (or controller). Specifically, FIG. 6 shows a diagrammatic representation of a machine in the example form of a computer system 600 within which instructions 624 (e.g., software or program code) for causing the machine to perform (execute) any one or more of the methodologies described with FIGS. 1-5. The computer system 600 may be used for one or more of the entities (e.g., host system 110, emulator 120) illustrated in the emulation environment 100 of FIG. 1.

The example computer system 600 includes a hardware processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 which stores instructions 624 (e.g., software) embodying any one or more of the methodologies or functions described herein. The instructions 624 (e.g., software)

may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

As is known in the art, a computer system 600 can have different and/or other components than those shown in FIG. 6. In addition, the computer system 600 can lack certain illustrated components. For example, a computer system 600 acting as the emulator 120 may include one or more hardware processors 602, multiple storage units 616, a network interface device 620, and multiple configurable logic circuits (as described above with reference to FIG. 1), among other components, but may lack an alphanumeric input device 612 and a cursor control device 614.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-6. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software (or computer program code)) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the embodiments described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable storage medium storing executable instructions for generating a plurality of clocks signals of a design under test (DUT), the instructions to configure an emulator to:
    determine, for a plurality of clock signals of the DUT, a corresponding plurality of jitter clock values, each jitter clock value based on a jitter value and a clock parameter associated with the corresponding clock signal;
    select, from the plurality of jitter clock values, a lowest jitter clock value;
    transmit the lowest jitter clock value to a plurality of emulator components, each emulator component for generating a respective clock signal of the plurality of clock signals; and
    output an edge on a clock signal, from the plurality of clock signals, associated with the lowest jitter clock value, the edge being output by the emulator component for generating the clock signal associated with the lowest jitter clock value.

2. The non-transitory computer readable storage medium of claim 1, wherein the instructions further configure the emulator to:
    randomly select the jitter value from a jitter range associated with the clock signal.

3. The non-transitory computer readable storage medium of claim 1, wherein the clock parameter associated with the clock signal is associated with a period of the clock signal.

4. The non-transitory computer readable storage medium of claim 1, wherein the instructions further configure the emulator to:
    determine a jitter clock value from the plurality of jitter clock values by combining the jitter value and the clock parameter.

5. The non-transitory computer readable storage medium of claim 1, wherein the instructions further configure the emulator to:
    for each of the plurality of clock signals associated with a jitter clock value that is not the lowest jitter clock value, maintain a state of the clock signal.

6. The non-transitory computer readable storage medium of claim 1, wherein the instructions further configure the emulator to:
    for each of the plurality of clock signals associated with a jitter clock value:
        generate an additional jitter clock value for the clock signal based on whether the jitter clock value is the lowest jitter clock value.

7. The non-transitory computer readable storage medium of claim 6, wherein the instructions further configure the emulator to:
    generate the additional jitter clock value to be a difference between the jitter clock value and the lowest jitter clock value in response to the jitter clock value not being the lowest jitter clock value.

8. The non-transitory computer readable storage medium of claim 6, wherein the instructions further configure the emulator to:
    generate the additional jitter clock value by summing an additional clock parameter associated with the clock signal and an additional jitter value randomly selected from a jitter range, in response to the jitter clock value associated with the clock signal being the lowest jitter clock value.

9. A non-transitory computer readable storage medium storing executable instructions for generating a clock signal of a design under test (DUT), the instructions to configure an emulator to:
    obtain from storage a clock parameter associated with the clock signal of the DUT being emulated by the emulator;
    randomly generate a jitter value;
    pass the clock parameter and the randomly generated jitter value to an accumulator in the emulator; and
    generate, by the accumulator, a jitter clock value for the clock signal based on the clock parameter and the jitter value.

10. The non-transitory computer readable storage medium of claim 9, wherein the instructions further configure the emulator to:

identify a plurality of jitter clock values including the generated jitter clock value, each of the plurality of jitter clock values associated with a different clock signal of the DUT;
identify, from the plurality of jitter clock values, a lowest jitter clock value; and
output an edge on a clock signal associated with the lowest jitter clock value.

11. The non-transitory computer readable storage medium of claim 9, wherein the clock parameter and the jitter value are combined to generate the jitter clock value.

12. The non-transitory computer readable storage medium of claim 9, wherein the jitter value is generated by randomly selecting the jitter value from a jitter range associated with the clock signal.

13. The non-transitory computer readable storage medium of claim 9, wherein the clock parameter associated with the clock signal is associated with a period of the clock signal.

14. A clock generator emulated by an emulator, the clock generator comprising:
a first storage configured to store a first jitter clock value associated with a first clock signal of a design under test (DUT) emulated by the emulator, the first jitter clock value determined based on a first jitter value and a first clock parameter associated with the first clock signal;
a second storage configured to store a second jitter clock value associated with a second clock signal of the DUT, the second jitter clock value determined based on a second jitter value and a second clock parameter associated with the second clock signal;
a minimum operator configured to receive a first signal from the first storage representing the first jitter clock value, receive a second signal from the second storage representing the second jitter clock value, and determine, based on the received first signal and second signal, that the first jitter clock value is less than the second jitter clock value; and
a comparator configured to receive an input signal from the minimum operator and to output an edge on the first clock signal based on the input signal indicating that the first jitter clock value is less than the second jitter clock value.

15. The clock generator of claim 14, further comprising an additional comparator wherein:
the minimum operator is further configured to output to the comparator and to the additional comparator the first jitter clock value based on the first jitter clock value being less than the second jitter clock value;
the comparator is further configured to:
receive the first jitter clock value output by the minimum operator;
read from the first storage the stored first jitter clock value; and
output the edge of the first clock signal based on the first jitter clock value output by the minimum operator being the same as the first jitter clock value read from the first storage; and
the additional comparator configured to:
receive the first jitter clock value output by the minimum operator;
read from the second storage the stored second jitter clock value; and
maintain a state of the second clock signal based on the first jitter clock value output by the minimum operator being different than the second jitter clock value read from the second storage.

16. The clock generator of claim 14, further comprising:
a first random jitter generator configured to randomly select the first jitter value from a first jitter range associated with the first clock signal; and
a second random jitter generator configured to randomly select the second jitter value from a second jitter range associated with the second clock signal.

17. The clock generator of claim 14, further comprising:
a first random jitter generator configured to:
generate a third jitter clock value for the first clock signal based on a third jitter value and a third clock parameter associated with the first clock signal; and
store the third jitter clock value in the first storage to replace the first jitter clock value;
an additional comparator configured to:
generate a fourth jitter clock value for the second clock signal based on a difference between the second jitter clock value and the first jitter clock value; and
store the fourth jitter clock value in the storage component to replace the second jitter clock value.

18. A method for generating a plurality of clocks signals of a design under test (DUT), the method comprising:
determining, by an emulator and for a plurality of clock signals of the DUT, a corresponding plurality of jitter clock values based on a jitter value and a clock parameter associated with the corresponding clock signal;
selecting, by the emulator from the plurality of jitter clock values, a lowest jitter clock value;
transmitting the lowest jitter clock value to a plurality of emulator components, each emulator component for generating a respective clock signal of the plurality of clock signals; and
outputting, by the emulator, an edge on a clock signal, from the plurality of clock signals, associated with the lowest jitter clock value, the edge being output by the emulator component for generating the clock signal associated with the lowest jitter clock value.

19. The method of claim 18, further comprising:
for each of the plurality of clock signals associated with a jitter clock value that is not the lowest jitter clock value, maintaining a state of the clock signal.

20. The method of claim 18, further comprising
for each of the plurality of clock signals associated with a jitter clock value:
generating an additional jitter clock value for the clock signal based on whether the jitter clock value is the lowest jitter clock value.

* * * * *

UNITED STATES PATENT AND TRADEMARK OFFICE
CERTIFICATE OF CORRECTION

PATENT NO.        : 9,898,565 B2
APPLICATION NO.   : 14/952656
DATED             : February 20, 2018
INVENTOR(S)       : Ludovic Marc Larzul Page 1 of 1

It is certified that error appears in the above-identified patent and that said Letters Patent is hereby corrected as shown below:

In the Claims

Claim 1, Column 13, Lines 55-56, delete "a plurality of clocks signals" and insert --a plurality of clock signals--.

Claim 18, Column 16, Line 30, delete "a plurality of clocks signals" and insert --a plurality of clock signals--.

Signed and Sealed this
Fourteenth Day of May, 2019

Andrei Iancu
*Director of the United States Patent and Trademark Office*